United States Patent [19]

Mannava et al.

[11] Patent Number: 4,551,017
[45] Date of Patent: Nov. 5, 1985

[54] LASER DOPPLER VELOCIMETER FOR MEASURING TORSIONAL VIBRATION

[75] Inventors: Seetha R. Mannava, Latham; John F. McDonald, Clifton Park; Henry A. Scarton, Troy, all of N.Y.

[73] Assignees: General Electric Co., Schenectady; Rensselaer Polytechnic Institute, Troy, both of N.Y.

[21] Appl. No.: 426,400

[22] Filed: Sep. 29, 1982

Related U.S. Application Data

[63] Continuation-in-part of Ser. No. 239,704, Mar. 2, 1981, abandoned.

[51] Int. Cl.[4] .......................... G01P 3/36; G01B 9/02; G01N 21/41; G01N 29/04
[52] U.S. Cl. .................................... 356/28.5; 73/657; 350/162.23
[58] Field of Search .................... 356/28.5; 73/657; 350/162.23

[56] References Cited

U.S. PATENT DOCUMENTS

| | | | |
|---|---|---|---|
| 3,419,330 | 4/1965 | Schneider | 356/106 |
| 3,604,804 | 9/1971 | Penney et al. | 356/28 |
| 3,687,512 | 8/1972 | Brun | 356/28 |
| 3,858,203 | 12/1974 | Constant | 343/6.5 |

OTHER PUBLICATIONS

M. K. Mazumder, Applies Physics Letters, vol. 16, No. 11, Jun. '70, pp. 462–464.
J. W. Goodman, "Some Fundamental Properties of Speckle", Journal of the Optical Society of America, vol. 66, No. 11, Nov. 1976.
D. G. Simpson and D. G. S. Lamb, "A Laser Doppler System for the Measurement of Torsional Vibration", NEL Report #639, Jul. 1977.

*Primary Examiner*—S. C. Buczinski
*Attorney, Agent, or Firm*—John F. Ahern; Paul Checkovich

[57] ABSTRACT

The velocity and change in velocity of a rotating or otherwise moving surface is measured by a laser Doppler technique. In particular, a diffraction grating is formed on the moving surface either by machining processes or by affixing a ready-made grating thereto. The grating surface exhibits periodicity in one or more directions, either separately or simultaneously. The presence of the grating produces Bragg order diffraction reflections at specific angles relative to the surface. These Bragg order reflections contain information, in the form of Doppler shifts, concerning the motion of the surface and the body to which it is attached. This Bragg order Doppler shift information is readily analyzable using conventional signal processing apparatus and processes to produce the desired velocity and torsional vibration information.

9 Claims, 10 Drawing Figures

LASER DOPPLER VELOCIMETER FOR MEASURING TORSIONAL VIBRATION

This application is a continuation-in-part of our co-pending U.S. patent application Ser. No. 239,704 filed Mar. 2, 1981, now abandoned and commonly assigned, herein incorporated by reference.

BACKGROUND OF THE INVENTION

This invention relates to devices for measuring rotational velocity and torsional vibration. More particularly, the present invention relates to such devices which employ Doppler shifts in reflected laser light.

The velocity and change in velocity of a moving surface constitute important process or operating parameters whose precise determination is often important or critical to the operation of equipment which is designed to be operated at specific speeds. While the instant invention is generally directed to the determination of rotational velocities, it will be readily understood that the principles discussed herein are equally applicable to measurement of other relatively flat moving surfaces including belts, conveyor lines, sheet material, and other similar bodies. In many such situations, it is important that the measurement device not be in actual physical contact with the body in motion. This may be due to the fact that the surface is moving at an extremely high speed or because of an otherwise harsh work environment. Additionally, non-contacting rotational velocity measurement devices are important in those circumstances in which it is necessary not to damage the workpiece as might occur if the moving surface were to be in contact with the measurement transducer.

A particularly useful area in which this invention functions is in the determination of the rotational velocity and torsional vibration associated with the rotors or large electrodynamic machines such as electrical generators employed to produce electrical power. These machines employ relatively strong magnetic fields. Thus, an electrical fault which occurs in the transmission system to which these generators are coupled, produces extremely high torques which tend to produce torsional oscillatory motion in the generator rotor. More particulary, the torsional vibration history of these rotors is useful in predicting their expected life and in otherwise analyzing the complex relationship that exists between the electrical generation facility and the power transmission portion of the utility system.

In the above-described situation, with respect to electrical generator rotors, it is seen that the rotational velocity and changes in this velocity, produced by torsional vibration, are the principal parameters of interest. However, in this situation and in others, it is also important to provide a means for measuring axial or thrust velocity. A unique feature of the instant invention permits the simultaneous determination of rotational (tangential) and axial velocities.

Other experiments in the field have also employed laser Doppler shift and in particular laser speckle (see below) Doppler shift to determine a single velocity from a moving surface. However, none of these experimenters employ surface properties to improve signal to noise ratio, to produce Bragg diffraction reflections or to measure motion in a plurality of directions. In general, such experiments appear to be limited to the analysis of "speckle". Speckle is the pattern of reflected illumination produced when a reflecting object is illuminated by light from a continuous coherent light source such as a laser. Speckle is an unordered and seemingly random pattern produced by microscopic features of the nominally smooth surface being illuminated. Nonetheless, it appears that the speckled pattern may be employed, particularly when the surface is moving, to determine velocity. If the surface moves with velocity v, the speckle pattern can be made to move with the same velocity and in the same direction by suitable positioning of the optical components. A laser speckle system is described, for example, in U.S. Pat. No. 3,604,804 issued to Carl M. Penney and Henry Hurwitz, Jr. on Sept. 14, 1971. The nature of speckle is also discussed in a paper by J. W. Goodman and published in the Journal of the Optical Society of America in Volume 66, No. 11, Nov. 1976 in a paper entitled, "Some Fundamental Properties of Speckle". Similarly, D. G. Simpson and D. G. S. Lamb in a paper dated 1977 entitled, "A Laser Doppler System for the Measurement of Torsional Vibration" published by the National Engineering Laboratory of the United Kingdom in NEL Report No. 639 employ a dual beam laser interferometer for the measurement of torsional vibrations of a rotating shaft. However, there is no diffraction grating present on the surface in the Simpson and Lamb apparatus nor is there any attempt therein presented for the simultaneous measurement of tangential and axial motions; this is also true of the patent to Penney, et al. and the Goodman paper.

SUMMARY OF THE INVENTION

According to an aspect of the invention, there is provided an apparatus for measuring velocity of a moving surface comprising a grating-like structure on the surface, the grating-like structure having at least one periodicity, means for directing at least one beam of substantially monochromatic light onto said grating-like structure and detection means including at least one photo-detector positioned at a predetermined angle with respect to at least one of the beam and the surface to receive light diffracted by the grating-like structure and effective to produce an oscillating electrical signal with a frequency related to the velocity of the surface.

According to a feature of the invention, there is provided a method for measuring a velocity of a surface along an axis comprising forming a grating-like structure having at least one periodicity oriented in the direction perpendicular to the motion on the surface, splitting a beam of substantially monochromatic light into at least first and second beams, directing at least the first beam onto the grating-like structure at a first predetermined angle with respect to a normal to the surface, positioning a photo-detector to receive a predetermined Bragg order of light produced by the first grating-like structure from the first beam, directing a third light derived (reflected from the second beam) from the second beam into the photo-detector, and measuring a Doppler frequency derived from detection of the frequency shaft in the higher order Bragg order and the third light.

According to a further feature of the invention, there is provided a method for measuring a velocity of a surface along an axis comprising forming a grating-like structure having at least one periodicity on the surface, splitting a beam of substantially monochromatic light into first and second beams, impinging the first and second beams on the same spot on the grating-like structure, aligning the first and second beams at equal angles at opposed sides of a normal to the surface at the spot, simultaneously intercepting at least one Bragg order produced by each of the first and second beams in a photo-detector, and determining a heterodyne frequency of an electrical signal from the photo-detector.

According to a further feature of the invention, there is provided a method for improving statistical purity of Doppler shifts in monochromatic light reflected from a moving surface comprising forming a reflection-type diffraction grating on the surface and employing light reflected at a Bragg order greater than zero for determining the Doppler shifts.

A significant element of the present invention is the presence of a diffraction grating on the moving surface. The use of such a grating produces several advantages which include: the ability to detect motion in both the tangential and axial directions; a significantly improved signal-to-noise ratio; and a highly collimated set of reflected beams of varying intensity which may be employed in design trade-offs between signal strength and resolution. The diffraction grating may be separately formed or integrally formed on the surface. Furthermore, we have discovered that a periodicity can be found in many industrial surfaces which is sufficient for effective use as a grating without special treatment being required.

A heterodyning means for use with the detector is envisioned in one of two embodiments. In a "reference beam" apparatus a single incident laser beam is employed and is passed through a half-silvered mirror, part of the beam being reflected, the other part of the beam passing through the half-silvered mirror and being reflected from the moving surface. In this embodiment of the invention, the mirror is positioned with respect to the moving surface and the incident beam so that the beam reflected from the mirror and the beam reflected from the surface interfere to produce a mixing or heterodyning effect at a point in space at which a photo-detector has been positioned. In accordance with another embodiment of the present invention, the heterodyning means is established by employing dual laser beams which simultaneously impinge upon the moving surface at selected angles. The dual beam configuration is the generally preferred embodiment of the present invention. However, in certain applications the advantages of the reference beam configuration may be preferred.

In accordance with one embodiment of the present invention the diffraction grating on the moving surface is formed in the surface itself, for example by a machining process. In accordance with another embodiment, the diffraction grating is a separate structure which is affixed to the moving surface. The grating may exhibit periodicity in one direction or even in two directions simultaneously.

The present invention may also include a frequency detector, means for producing a velocity signal from the frequency information and further means for producing signals indicative of changes in velocity from the velocity signal.

The present invention also includes a method of improving the signal strength or laser light signals reflected from a surface comprising providing the surface with periodic surface height variations.

Accordingly, it is an object of the present invention to provide an accurate, non-contacting means for measuring rotational velocity and torsional vibration.

It is another object of the present invention to provide an apparatus for measuring the axial motion of a rotating body.

It is a further object of the present invention to provide an apparatus for measuring the tangential velocity of a rotating body.

It is also an object of the present invention to provide an apparatus for simultaneously measuring the tangential and axial motion of a rotating body.

It is a further object of the present invention to provide means for improving the signal-to-noise ratio for laser signals reflected from moving surfaces.

It is a further object of the present invention to measure motion in the tangential and axial directions simultaneously.

It is a still further object of the present invention to improve the statistical purity of the Doppler frequency shift by utilizing a non-random surface such as a periodic grating.

Finally, it is an object of the present invention to simplify the instantaneous Doppler velocity estimator.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

FIG. 2b is a front view of the rotating body shown in FIG. 2a.

DETAILED DESCRIPTION OF THE INVENTION

Figure 1:
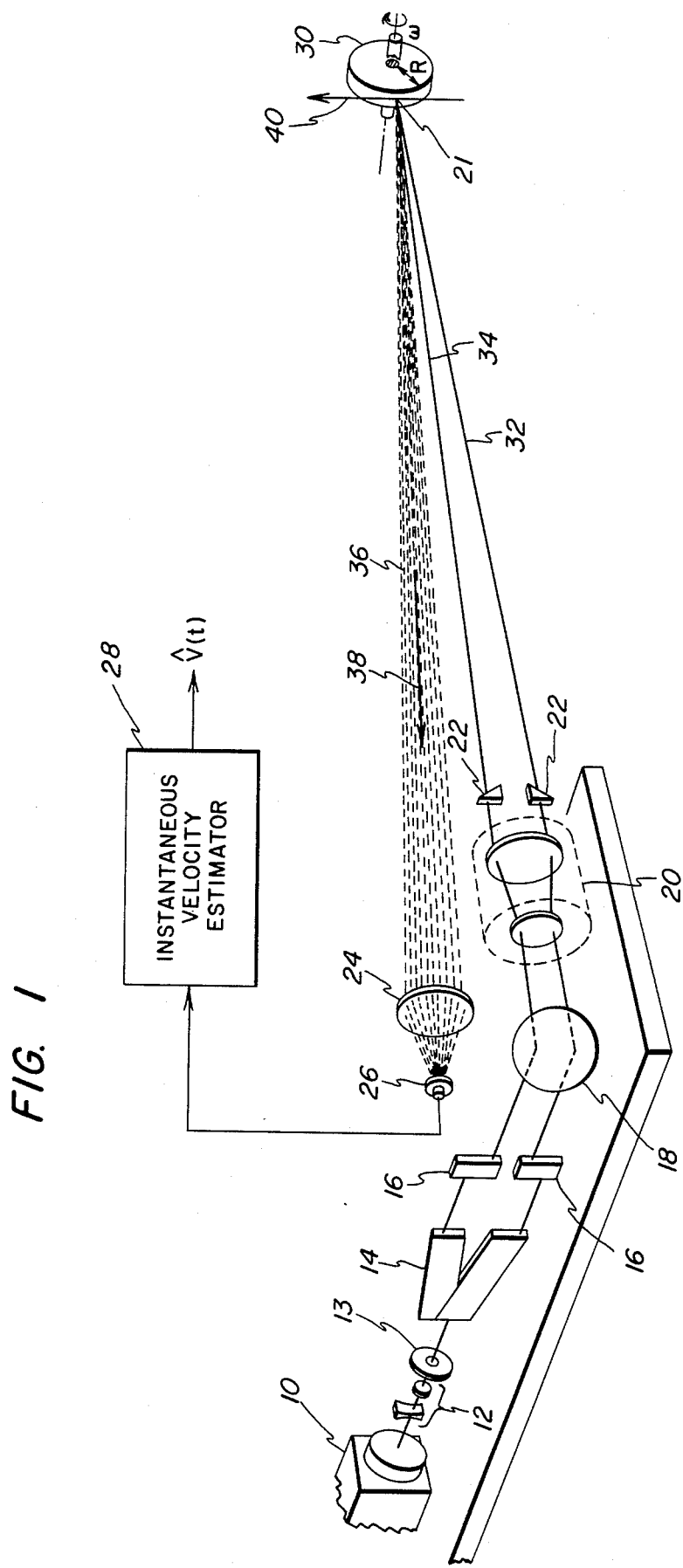
FIG. 1 is an isometric view illustrating a preferred embodiment of the present invention for measuring the motion of a rotating surface.

FIG. 1 illustrates a configuration of optical devices in accordance with the dual beam embodiment of the present invention. As discussed above, in this embodiment, two beams 32 and 34 of coherent light are made to impinge upon a rotating body 30. An important aspect of the present invention not visible in the view shown in FIG. 1, is the presence, on the rotating surface, of a transmission type or reflection type diffraction grating. This diffraction grating may comprise a separate strip which is affixed to the rotating surface or it may actually comprise grooves formed in the surface as by machining operations. The presence of the diffraction grating produces highly collimated light transmissions or reflections not only at the same angle as the angle of incidence from the normal to the surface in accordance with Snell's law, but also at other, discrete angles, referred to as Bragg angles. Each discrete Bragg angle is identified as a Bragg order beginning at zero wherein the angle of reflection or transmission is equal to the angle of incidence. At angles away from the zero Bragg order, the orders are identified as 1, 2, etc., and may have a positive or negative sign. The Bragg angles $\theta_{BN}$ are determined in accordance with the relation:

$$\sin \theta_{BN} = \pm (N\lambda)/2\pi\rho + \sin \theta_i,$$

Where:
$\lambda$ is the wavelength of the impinging light,
$2\pi\rho$ is the surface grating periodicity,
N is the Bragg order.

In the preferred embodiment, a reflection type diffraction grating is used. Bragg order reflections above the zero order contain Doppler shift information as a result of the interaction of the light beam with the moving surface. Accordingly, in preferred embodiments of the present invention, the receiving lens 24 and the photo-detector 26 are positioned to intercept at least one of these Bragg order reflections so that the Doppler shift information can be recovered.

In FIG. 1, the coherent continuous wave (cw) light source is provided by laser 10 which produces a beam passing through collimator 12 and polarization rotator 13. In general, a gas laser such as $CO_2$ laser or an argon-ion laser is preferred. Although a cw laser is preferred, pulsed lasers may also be employed.

In the dual beam embodiment, a beam splitter 14 produces upper laser beam 34 and lower laser beam 32, each of which pass through a beam angle reducer 16, is reflected from a mirror 18 into beam expander 20 and through optical wedges 22 which cause the beams to be directed in phase to the same spot 21, in a converging fashion, on the surface of the rotating body 30. It is to be noted that while all of the optical components shown perform a desirable function in preconditioning the coherent laser beam, they are not all essential for the proper operation of the present invention. In particular, collimator 12, beam angle reducer 16, mirror 18, and beam expander 20 are provided essentially for convenience in setting up a compact apparatus.

In the particular arrangement shown the rotating body 30 has a mean radius R and is rotating at an angular velocity of $\omega$ to produce a circumferential tangential velocity v(t) as designated by arrow 40. It is to be noted that if one of the impinging beams (either 32 or 34) possesses a light frequency $\nu$ then, because of the Doppler shift effect, the reflected beams of light will have beams of frequency $\nu \pm N\nu_D$, where $\nu_D$ is the frequency of the Doppler shift and N represents the Bragg order index number. For example, when N+0, the angle of incidence is equal to the angle of reflection for the reflected beam and no Doppler shift occurs. When N is equal to 1, a Doppler shift is found in the reflected beam. Since the Bragg order reflections, which are due to the presence of the diffraction grating on the moving surface, are located at discrete angles around the zeroth order reflection, it is possible to intercept light beams whose frequencies are shifted by high order multiples of the basic Doppler shift frequency $\nu_D$. A significant advantage of the present invention is that the presence of the diffraction grating permits higher resolution measurements of $\nu_D$ for larger values of N. Moreover, the accuracy of this measurement may be traded off, in those circumstances where appropriate, for somewhat less accurate measurements made in a shorter period of time. However, it should be also noted that light signal intensity generally drops off with increasing N, that is, at angles of increasingly high Bragg order reflection. The intensity drop off can be partly compensated for by employing deeper diffraction grating corrugations or deeper corrugations in the surface of the rotating body 30.

A scattered light beam 36, which represents one of several beams reflected from the surface is directed into receiving lens 24 which focuses the light into photo-detector 26. The direction of beam 36 is typified by arrow 38. In both reference beam and dual beam embodiments of the present invention, heterodyning occurs in photo-detector 26 which is a square law device. Photodetector 26 in both cases, produces an electrical signal which is applied to instantaneous velocity estimator 28 to produce an estimate V(t) of the tangential velocity of the rotating surface. The device represented by block 28 is conventionally known in the art and readily available and might be implemented, for example, by a zero crossing detector or other frequency measuring device. A significant advantage of the present invention is that the purity of the Bragg generated Doppler makes such simple estimation methods and apparatus possible. The measured frequency of the electrical signal from the photo-detector 26 is proportional to the instantaneous surface velocity v(t). This proportionality is governed by the relation $v(t)=(\frac{1}{2})\lambda\nu_D(t)/\sin\theta_i$ for the dual beam system where $\theta_i$ is the angle of incidence with respect to the surface normal. Either analog or digital electrical devices may be employed to provide a display depicting either the instantaneous velocity or changes in this velocity which are indicative of system torque levels as measured at one or more positions using two or more monochromatic wavelengths (colors) along a generator shaft for example. Thus, the present invention may also be employed to measure not only instantaneous surface velocity but also torsional vibrations of the rotating body 30.

Figure 2A:
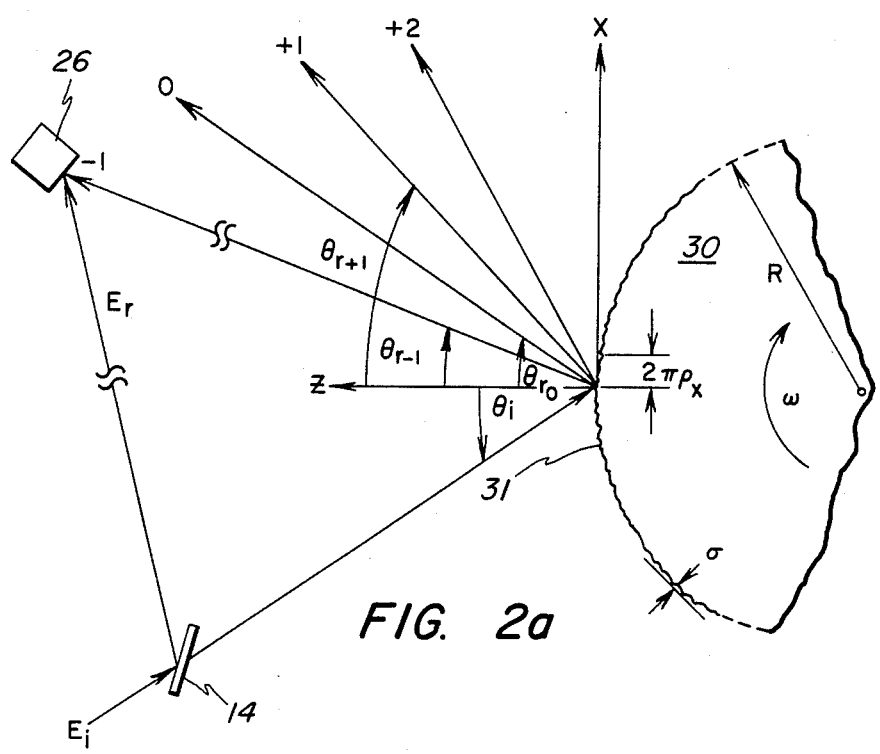
FIG. 2a is a side view illustrating the reference beam embodiment of the present invention in which the rotating surface possesses a diffraction grating surface with periodicity in the x direction (that is, circumferentially).

FIG. 2a illustrates one embodiment of the present invention employing a reference beam to perform the heterodyning for removing the optical laser source frequency $\nu$. FIG. 2a also illustrates the presence of the various Bragg order reflections denoted by the index numerals +2, +1, 0, and −1, as shown in the figure. Beam $E_i$ is incident upon beam splitter 14. Part of the beam $E_i$ is transmitted therethrough to strike the surface of the rotating body 30. Beam splitter 14 may be any convenient optical device such as, for example, a prism or a half-silvered mirror. Rotating body 30 rotates with an angular velocity $\omega$ and has a mean radius of R. The term "mean radius" is employed to emphasize the fact that the surface has regular corrugations therein with a circumferential spacing between peaks of $2\pi\rho_X$. The corrugations have an amplitude of $\sigma$ as measured from the mean surface to either the trough or crest of the periodic ripples in surface 31. The reference numeral 31 particularly refers to the type of corrugated surface shown in FIG. 2a and 2b in which corrugations extend with respect to the x and z axes. The incident beam is incident upon rotating body 30 at an angle $\theta_i$ with respect to the normal to the surface which here is the same as the z axis. It should be noted that the lengths of the arrows denoting the x and z axes, (and later the axis y) are drawn only for convenience, the lengths of these reference axis arrows being irrelevant to the present invention. Nonetheless, the set of x, y and z axes, as shown, provides a convenient reference frame with respect to which the various incident and reflected beams may be described.

The zeroth order Bragg reflection occurs at an angle of $\theta_{r_0}$ as indicated in FIG. 2a. In particular, it is true that $\theta_i$ equals $\theta_{r_0}$. In addition to the zeroth Bragg order reflection, designated by the numeral zero, adjacent to the beam reflection shown, there are other Bragg order reflections designated as +2, +1 and −1, respectively. The zeroth Bragg order contains no Doppler shift information. The other reflected beams do possess Doppler shift information. For example, the reflected beam designated by index numeral +2 contains light with a frequency of $v+2v_D$. Similarly, the beam designated by "−1" contains light at a frequency of $v-v_D$ and is reflected from the rotating surface at a Bragg angle of $\theta_{r-1}$. More particularly in its position shown in FIG. 2a, photo-detector 26 receives beam $E_r$ reflected from half-silvered mirror 14, (one form of beam splitter) and also the beam designated −1 which is reflected from the rotating surface at an angle of $\theta_{r-1}$ from the z axis. These two beams heterodyne in photodetector 26 to produce an electrical signal having a frequency $v_D$, which is proportional to the rotational velocity. The principal disadvantage of the reference beam embodiment as shown in FIG. 2a is that accurate positioning of photo-detector 26 is required.

Figure 2B:
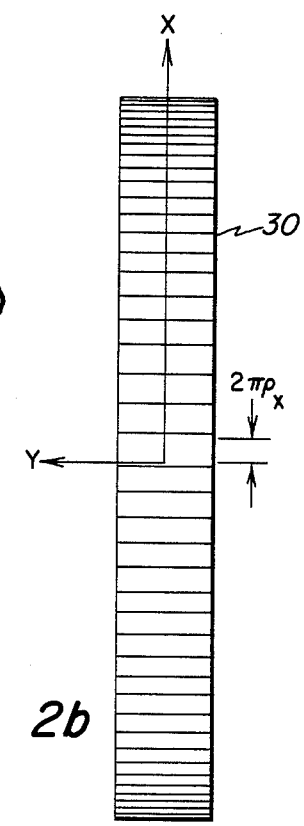

FIG. 2b is a view of the configuration shown in FIG. 2a looking toward rotating body 30 along the z axis in a direction opposite to that indicated by the arrow z in FIG. 2a. More particularly, FIG. 2b illustrates the position and orientation of the y axis which possesses the same direction as axial motion of rotating body 30. It should also be noted that the corrugations in surface 31 in FIGS. 2a and 2b are not drawn to scale, so that a more understandable account and description of the invention and its operation may be provided. It should also be noted that positioning of the x, y and z axes in FIGS. 2a and 2b is the same as, and is consistent with, the positioning of these axes in the other drawings contained herein. It should also be noted that the so-called x axis corrugations shown in FIG. 2 produce Bragg order reflections in the plane shown, that is, in the plane of the drawing at least with the incident beam direction indicated.

Figure 3:
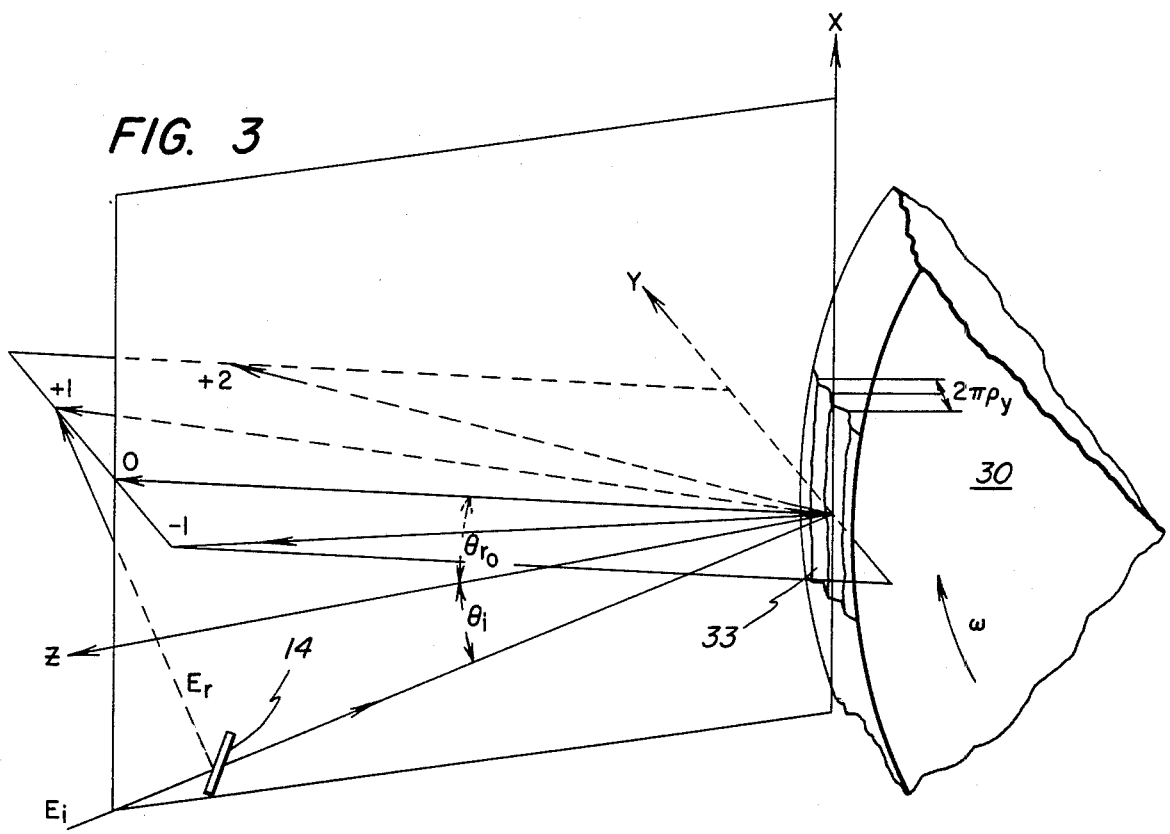
FIG. 3 is an isometric view illustrating a reference beam embodiment for use with a diffraction grating surface with periodicity in the y direction (that is, axial direction).

In those situations in which it is desirable to detect motion or measure velocity in the y direction the reference beam configuration illustrated in FIG. 3 depicts the relationships between the various incident and reflected beams. In particular, incident beam $E_i$, in the x-z plane (where the z axis is normal to the mean surface) impinges upon half-silvered mirror 14. A portion of this beam continues through the mirror 14 to impinge upon rotating surface 33 which has circumferential corrugations, machined grooves or striations with a period of $2\pi\rho_y$. The beam impinging upon the surface makes an angle of $\theta_i$ with respect to the horizontal z axis. A zeroth order Bragg reflection, denoted by index numeral zero, also makes an angle $\theta_i$ with the z axis as shown so that the impinging beam and the zeroth order Bragg reflection lie in the vertical x-z plane, as shown. However, the presence of surface periodicity produces multiple Bragg order reflections which are denoted by index numerals +2, +1 and 0 and −1. The +2, +1 and −1 beams contain Doppler shift information only with respect to motion in the y direction. These beams also lie in a plane containing the y axis, which makes an angle of $\theta_i$ with the y-z plane. In this particular embodiment, the half-silvered mirror 14 is positioned and oriented to produce a reference beam $E_r$ which is mixed with (that is, heterodyned with) the reflected +1 Bragg order beam in the photo-detector. It is, however, to be specifically noted that circumferentially directed grating grooves produce Bragg order reflections not in the x-z plane as in the case of FIG. 2 but rather in a plane perpendicular to the x-z plane and passing through the y axis as shown. In short, placement of a photo-detector at the intersection of beam $E_r$ with the +1 Bragg order reflection makes it possible to produce an electrical signal from the photo-detector with a Doppler frequency component of $Nv_D$ where N equals +1 corresponding to the designation of the +1 Bragg order reflection and $v_D$ is the Doppler frequency shift due only to y axis motions. Thus, if there is no y axis motion, no Doppler shift is observed on any of the Bragg orders +2, +1, 0, −1, etc.

Figure 4:
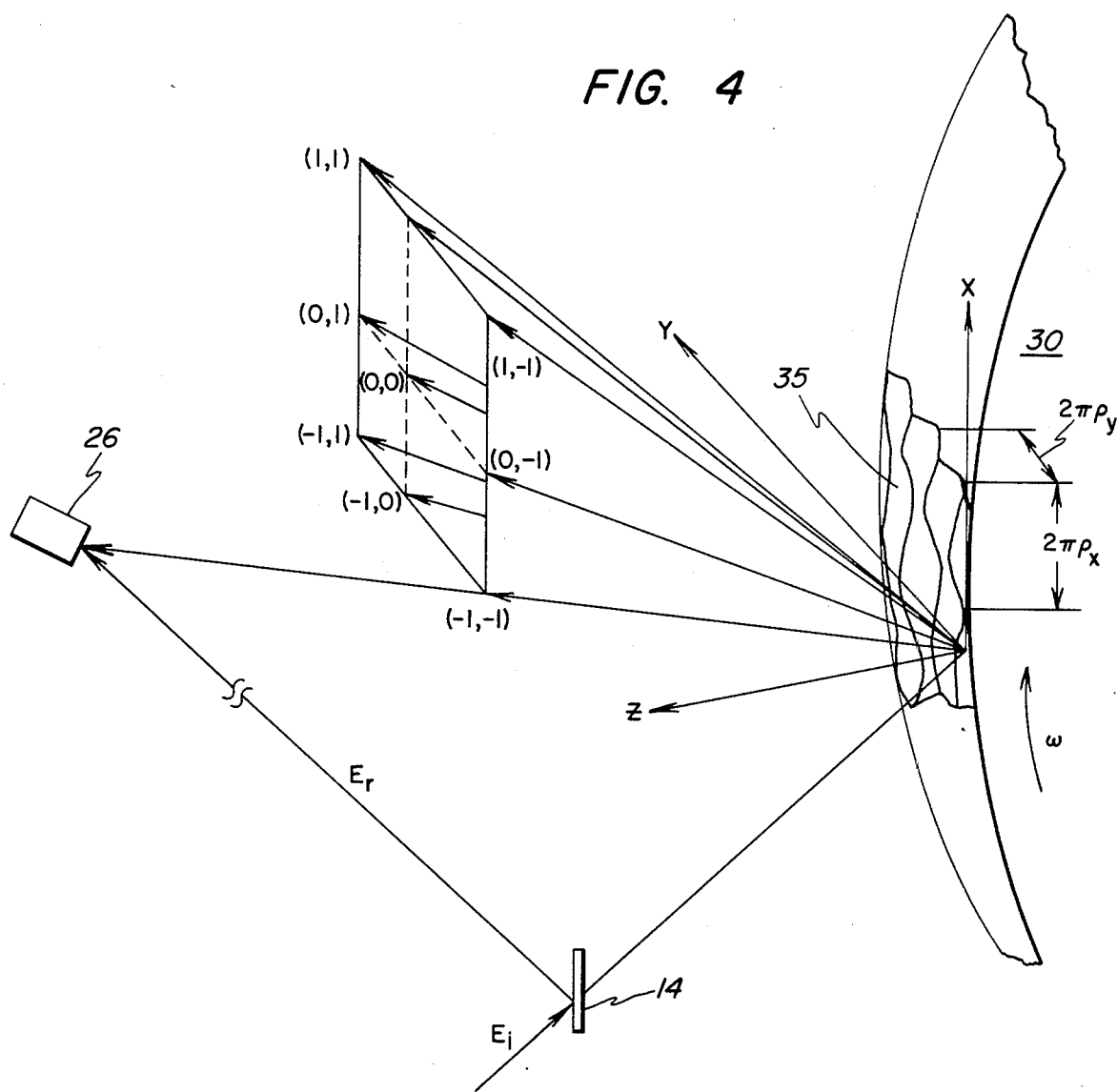
FIG. 4 is an isometric view of a reference beam embodiment of the present invention in which the rotating surface has a grating thereon with periodicity in both the x and y directions simultaneously.

FIG. 4 illustrates a reference beam configuration combining the features illustrated in FIGS. 2 and 3. In particular, the surface, now designated by reference numeral 35 exhibits periodicity in both the x and y directions with spacing between the peaks being given by $2\pi\rho_x$ and $2\pi\rho_y$, respectively. As in other reference beam configurations, heterodyning occurs in the photodector 26. However, to distinguish various Bragg order reflections which occur from the surface because of the effect of the multiply periodic grating, ordered pairs of numbers are employed to designate the beams. Consistent with the above, the beam designated (0, 0) is the zeroth order Bragg reflection and contains no Doppler information for either x axis or y axis motion. In the particular example shown the (−1, −1) beam is heterodyned or mixed with the reference beam $E_r$. In general, there are a large number of Bragg order reflections of the form (0, j) where j is ±1, ±2, etc. which are particularly useful in measuring motion in the y direction only. Similarly, Bragg order reflections of the form (i, 0) where i is ±1, ±2, etc., are useful for measuring motion in the x direction only. By employing two photo-detectors, motion in the x and y directions may be measured. Because the grating on the surface of rotating body 30 in FIG. 4 is multiply periodic and possesses corrugations in both the x and y directions, if the motion of the surface is in the positive x direction, then the "up" Doppler shift is observed on the Bragg order reflections labeled (1, 1), (1, 0) and (1, −1) and the "down" Doppler shift is observed on the Bragg order reflections labeled (−1, 1), (−1, 0) and (−1, −1). In this case velocity measurements may be made using the orders in either of these planes by mixing with the reference beam, as illustrated. Here, in the reference beam embodiment, the heterodyning means employs half-silvered mirror 14 to produce reference beam $E_r$.

On the other hand if the motion is in the y direction only, then the "up" Doppler shift is observed on the Bragg order reflections (1, +1), (0, +1) and (−1, +1); and "down" Doppler is observed on the Bragg order reflections designated (1, −1), (0, −1) and (−1, −1). Again, mixing in the photo-detector produces a Doppler signal proportional to the velocity as an output of the photo-detector.

Figure 5:
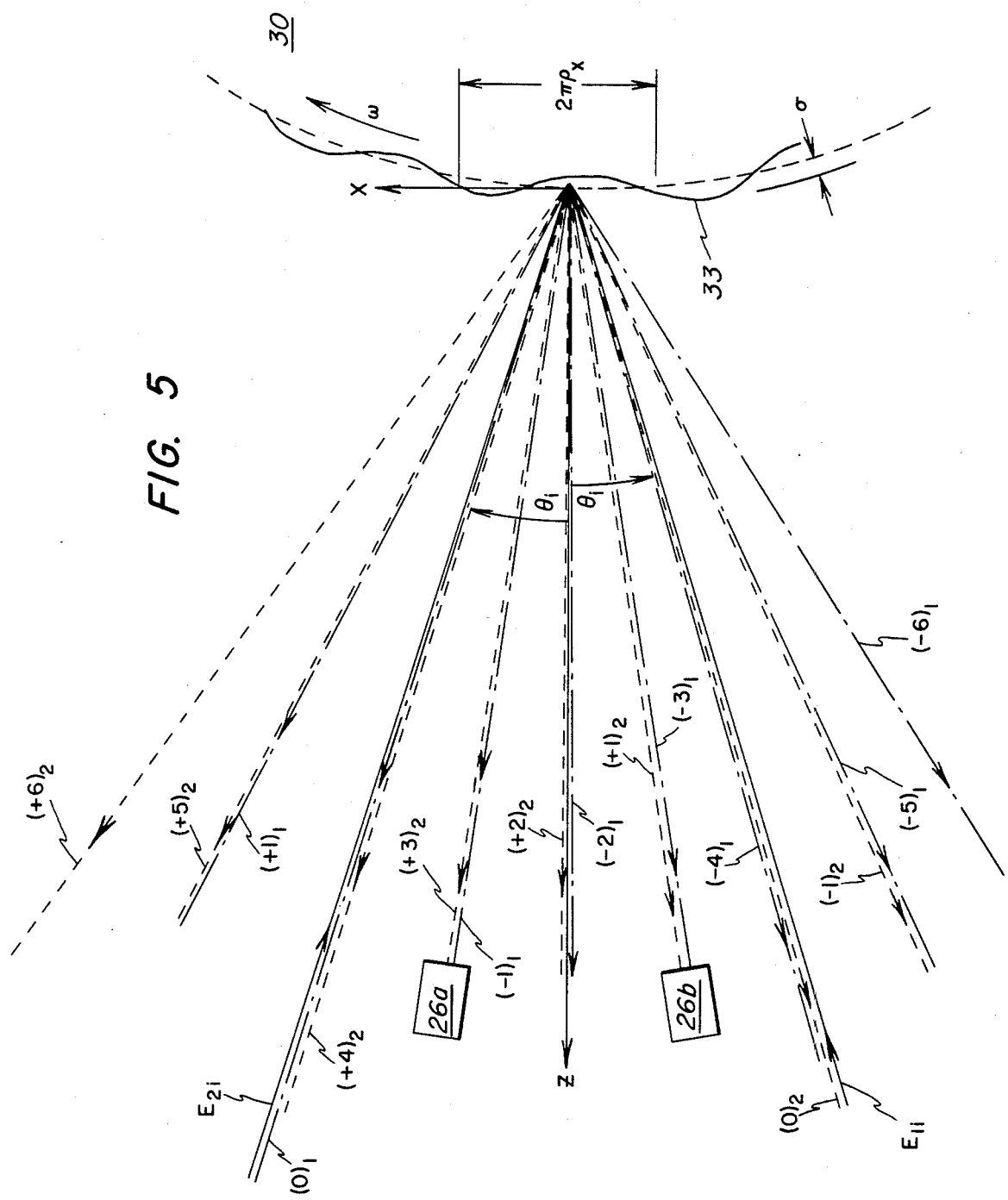
FIG. 5 is an elevation view illustrating a dual beam embodiment of the present invention in which the surface grating possesses periodicity only in the x direction.

FIGS. 2 through 4 above illustrate the reference beam embodiment of the present invention in which the heterodyning means is provided by half-silvered mirror 14 which produces reference beam $E_r$. In this embodiment heterodyning or mixing occurs in the photo-detector 26. However, in FIGS. 5 through 9 of the dual beam embodiment of the present invention is illustrated in which the heterodyning means is provided by splitting a beam of coherent light from a laser into two beams which are both made to impinge upon the same point on the moving surface at approximately equal angles of incidence with respect to the normal to the mean surface. With respect to FIG. 5 several things are worthy of note. First is the fact that the incident beams $E_{2i}$ and $E_{1i}$ are both shown as solid lines. These beams are incident at an angle $\theta_i$ with respect to the z axis, which is normal to the mean surface of rotating body 30. Second, FIG. 5 is similar to FIG. 2 except that the dual beam embodiment rather than the reference beam embodiment of the present invention is illustrated. Also, it should be noted that the reflected beams are shown as dotted lines, the nature of the dotted lines indicating whether the reflection is due to incident beam $E_{1i}$ or to incident beam $E_{2i}$. As a further aid in characterising the nature of these Bragg order reflections, subscripts (indicative of the incident beam) are shown following the parenthetical numbers which indicate the various Bragg orders. It should also be noted that at certain angles there are sometimes two or three beams shown. In each case, the beams actually overlap one another but are here shown slightly separated for purposes of illustration. Lastly, for the reflected Bragg orders designated as $(+6)_2$ and $(-6)_1$ only one reflected beam is shown to suggest the fact that the beam strength drops off with increasing Bragg order.

For an appreciation of the operation of the dual beam apparatus, consider the photo-detector 26a which receives reflected beams denoted as $(+3)_2$ and $(-1)_1$. This means that photo-detector 26a receives a triply upshifted Doppler beam due to incident beam $E_{2i}$ and a singly downshifted Doppler light beam due to incident beam $E_{1i}$. Thus there is a mixing or heterodyning of signals with frequencies of $\nu + 3\nu_D$ and $\nu - \nu_D$. The difference frequency then is $4\nu_D$ which is the frequency measured at the output of photo-detector 26a. In the region between $\pm \theta_i$, the difference frequency is higher than the Doppler frequency resulting from either of the incident beams. Outside the region between $\pm \theta_i$, between the rays $E_{2i}$ and $E_{1i}$, the Doppler shifts of both beams are of the same sign and thus heterodyning them creates a Doppler signal having a frequency proportional to the difference between the Bragg order numbers.

In the preceding description, it will be noted that all overlapped received pairs of reflected beams produce the same difference frequency of $4\nu_D$ no matter which pair is selected. Thus, the Doppler difference frequency is substantially the same no matter which overlapped beam pairs are detected. The Doppler difference multiplication factor is established by magnitude of incidence angle $\theta_i$. If incidence angle $\theta_i$ is made larger, Doppler difference frequencies of greater than $4\nu_D$ are detected from the overlapped beam pairs. Conversely, if incidence angle $\theta_i$ is made smaller, Doppler difference frequencies of less than $4\nu_D$ will be received. In general, for the dual beam system the Doppler shift is given by $\frac{1}{2}\lambda\nu_D(t)/\sin\theta_i$.

The ability to control the Doppler difference frequency by control of incidence angle $\theta_i$ is limited by the fact that Bragg order reflections generally decrease in amplitude with increasing orders. Special shaping of the surface corrugations may be employed to enhance higher order reflections and thus permit higher multiples of Doppler difference frequencies to be used.

Figure 6:
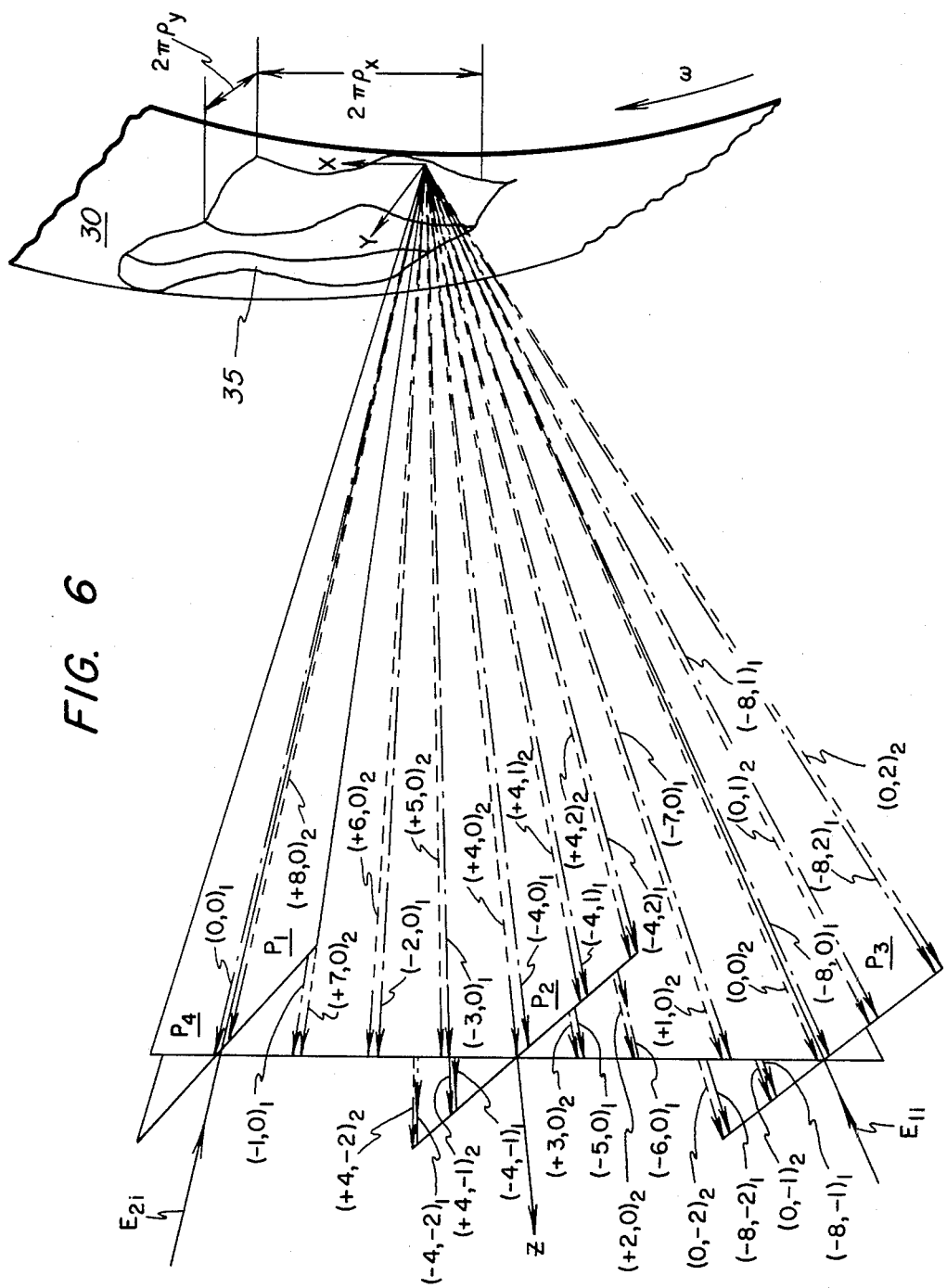
FIG. 6 is an isometric view of the dual beam embodiment illustrated in FIG. 5 except that the surface grating simultaneously possesses periodicity in both the x and y directions.

FIG. 6 is similar to FIG. 5 in that a dual beam embodiment is employed. It is also similar to FIG. 4 in that surface 35 is multiply periodic. That is, it possesses corrugations in both the x and y directions. Because of this, Bragg order reflections occur in a plurality of discrete planes. In FIG. 6, some of these planes are specifically denoted, such as: vertical plane $P_4$ which is coextensive with the x-z plane; plane $P_2$ which is coextensive with the y-z plane and planes $P_1$ and $P_3$ which contain the y axis and lie at an angle of $\theta_i$ with respect to the y-z plane. In this figure, incident beams $E_{1i}$ and $E_{2i}$ are shown as solid lines following the conventions described above with respect to FIG. 5. The reflected beams are shown as dashed lines and are designated by symbols of the form $(i, j)_k$ which denotes the $i^{th}$ Bragg order reflection due to corrugations in the x direction and the $j^{th}$ Bragg order reflection due to corrugations in the y direction, both of which are due to incident beam $E_{ik}$. Here k equals 1 or 2 and i and j both equal $\pm 1$, $\pm 2$, $\pm 3$, etc. As above, variously placed photo-detectors to intercept certain Bragg order reflection combinations for the two incident beams are employed to effect measurement of motion and vibration in either the x or y directions. For example, placement of a photo-detector on the z axis is desirable for detecting x axis motion. Similarly, a photodetector placed to intercept beams reflected in the $P_2$ plane, other than on the z axis, may be employed to measure y axis motion. It should be noted that here, as in FIGS. 3 and 4, any planes shown are imaginary planes which are drawn only for reasons of clarity and ease of understanding and so as to provide a degree of organization for the various reflected beams, more of which are actually present than can be practically shown in the drawings. In a system in which there are orthogonally disposed periodicities on the work piece the periodicity in one direction can enhance the amplitude of the Doppler signal due to the periodicity in the orthogonal direction and vice-versa. Thus signal strength in one Doppler direction can be enhanced so that if signal of motion is in the x direction, placement of the photodetector in the y direction may enhance signal strength of the x direction Doppler.

Figure 7:
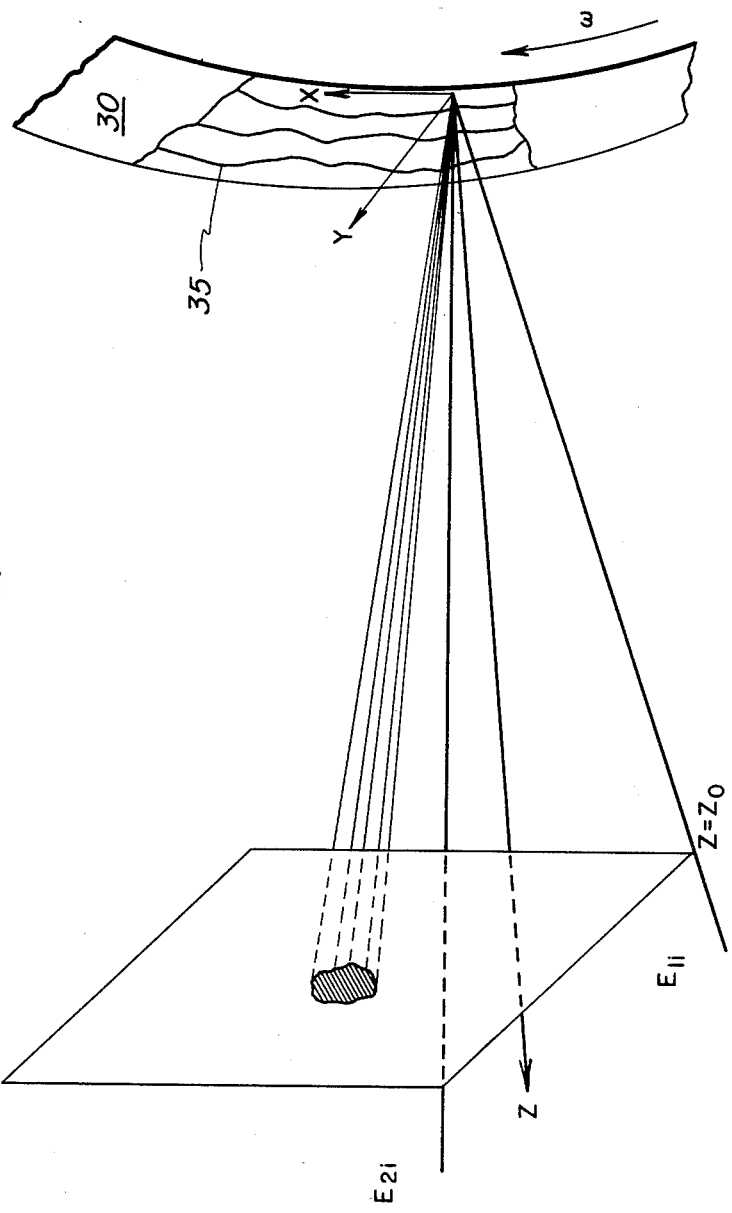
FIG. 7 is an isometric view illustrating a dual beam embodiment in the horizontal plane used to direct motion in the y direction.
Figure 8:
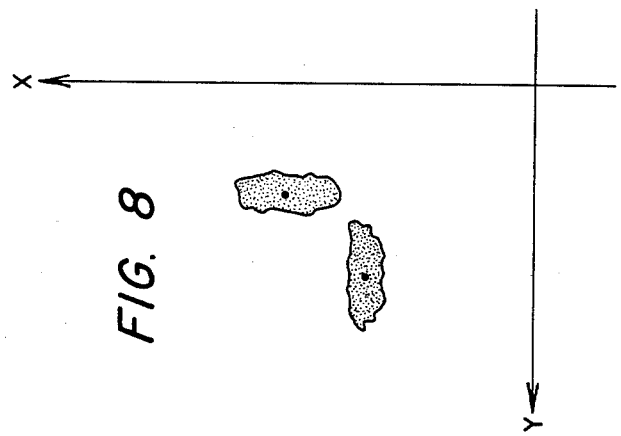
FIG. 8 illustrates the effect of rough corrugations on reflected beam collimation.

FIG. 7 illustrates the fact that it is possible to employ incident beams such as $E_{1i}$ and $E_{2i}$ lying in a horizontal plane containing the z axis. This drawing also illustrates the fact that it is not necessary to confine the dual beam mode to one in which the beams lie in a vertical plane.

Figure 9:
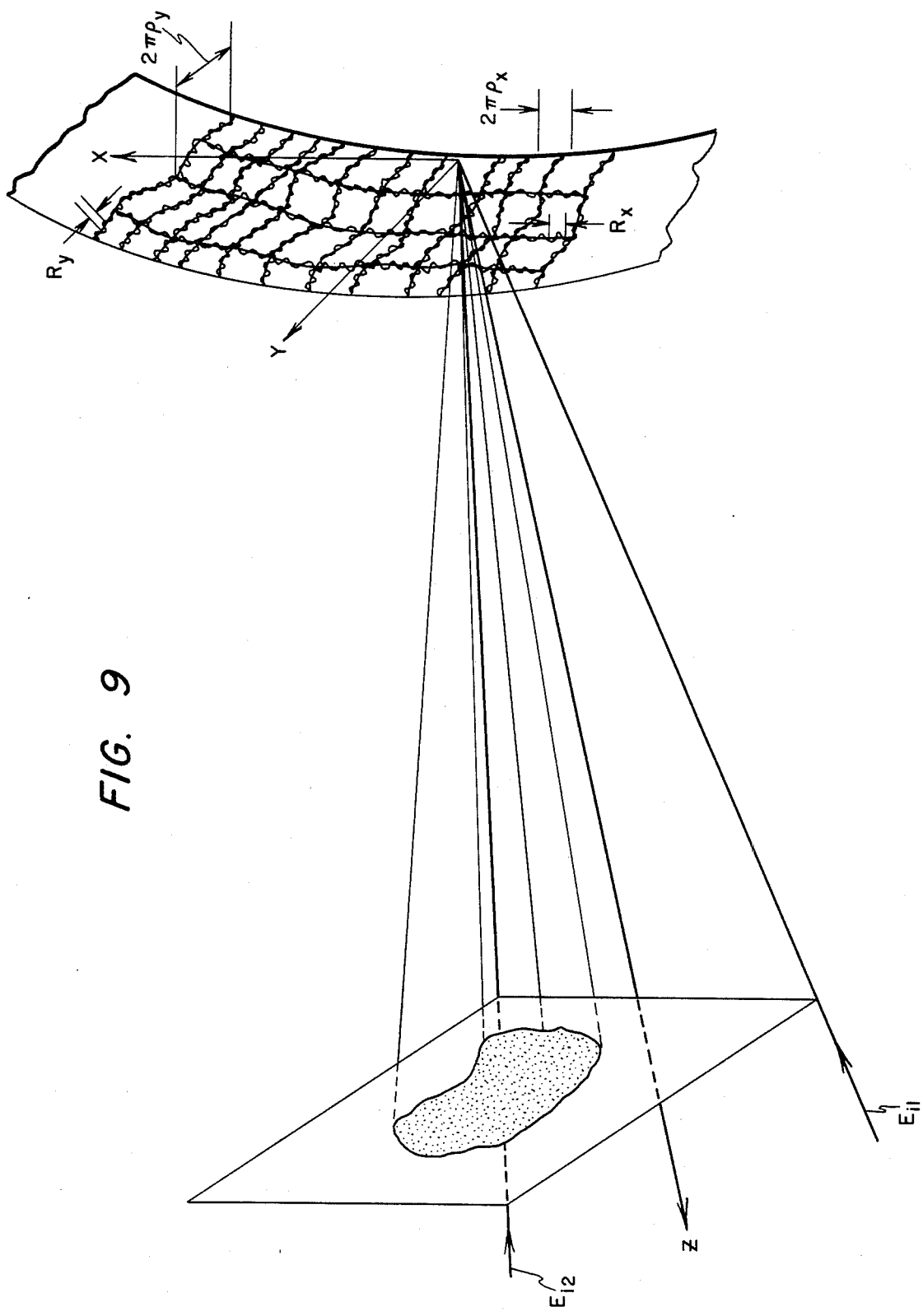
FIG. 9 is similar to FIG. 8 with the additional inclusion illustrating the nature of the moving surface.

Surface roughness such as that shown in FIG. 9 tends to reduce the desired signal-to-noise ratio since the Bragg beam is practically smeared. However, surface roughness in addition to the deliberate x and/or y corrugations does not prevent the operation of the present invention. Instead, as suggested in FIG. 8 the effect of such roughness it to produce a large plurality of Bragg order reflections generally directed at angles determined by the large-scale periodicities. This has the effect of spreading out the reflections as suggested in FIG. 8. The random surface roughness spoken of is further illustrated in FIG. 9 where this roughness is characterized by numbers $2\pi\rho y$ and $2\pi\rho y$ as shown which indicate average spacing between roughness peaks.

As noted in the preceding, a grating-like structure with a predominant periodicity must exist on the surface in order to produce the Bragg order reflections. The grating-like structure may be applied to the surface as a separate strip of diffraction grating or may be formed by a machining operation. We have discovered, however, that normal production processes without special treatment may produce a grating-like structure on the surface with sufficiently regular unidirectional or bidirectional periodicity to permit application on the invention.

During production of a generator shaft, for example, it is customary to forge a billet of metal into a slightly oversized cylinder and then to turn the cylinder in a lathe, removing a fine strip or chips of metal from the surface with a cutting tool which moves slowly axially back and forth until the desired final diameter is obtained. The surface of the shaft ends up with closely spaced parallel tangential grooves which represent the helical cut of the cutting tool in its last pass along the surface. These parallel tangential grooves can correspond to a diffraction grating with periodicity in the y direction shown in FIG. 3. The spacing, shape and depth of these grooves can, of course, be controlled by adjustments in the final steps of the machining process.

A cutting tool used for surface finishing is customarily a bar of steel with a shaped cutting edge at one end formed of a harder material. The bar is clamped to the lathe feed at its other end. While cutting, the cutting tool tends to vibrate or chatter at a characteristic frequency dependent upon some of its size, shape, material, unsupported length, sharpness and shape of cutting edge, hardness of the material being cut, depth of cut and speed of rotation. The shape of the groove is modified by such cutting tool chatter. Instead of the bottom of the grooves being smooth, they are periodically scooped to resemble an early hill-and-dale phonograph record (which were cylindrically shaped). That is, during chatter, the cutting edge periodically stops or catches in the material being cut and is then released. The resilience of the bar moves the cutting edge forward in an arc until the edge again catches in the material. This produces substantially arc-like periodic depressions in the surface. Tool chatter thus produces a substantial periodicity in the x direction so that the combined result of spiral grooves and tool chatter is periodicity in both the x and y directions as shown in FIG. 4.

Although the preceding description has been directly to the periodicity of finish in a machined cylindrical surface, the same effect may be noted in a plane surface which has been finished by a shaper of a planer or polisher with rubbing in a preferred direction in both of which a cutting tool makes parallel cuts in the surface. The groove and chatter phenomenon previously described can produce unidirectional or bidirectional periodicity in a corresponding manner.

Other standard industrial metal finishing techniques can produce surface finishes having sufficiently regular periodicity, at least over a short path, to be effectively used with the present invention. For example, surface grinding may produce lines or circular striations of reasonable regularity. Tool marks from router cutters, etc., may also produce usable grating-like surface structures.

When an imperfect grating such as, for example, a grating produced by tool chatter during machining is used, the Doppler difference frequency in the Bragg orders is no longer a pure frequency but instead is smeared out over a narrow frequency range centered on the statistical mean. The center of the Doppler difference frequency produced by the dual beam embodiment of FIGS. 1, 5 and 6 increases with increasing values of incidence angle $\theta_i$ as previously explained. However, the width of the frequency spreading due to imperfections in the grating is substantially independent of incidence angle $\theta_i$. Thus, large values of incidence angle $\theta_i$ produce Doppler difference frequencies having narrower frequency ranges as a percentage of their center frequencies. This equates to a purer Doppler difference frequency whose true value is easier to determine.

In the dual beam embodiments of FIGS. 5 and 6, incidence angles $\theta_i$ of the two beams are shown to be equal. Equality of incidence angles is not required for the apparatus to function. Instead, suitable unequal incidence angles may be employed to produce at least one overlapped pair of Doppler shifted beams for detection by a suitable detector. For example, one of the beams may be inclined at an incidence angle sufficient to optimize a high Bragg order reflection such as, for example, the 6th order along the normal line. The second beam may impinge, for example, at normal incidence and detection of the Doppler difference signal may also be made along the normal line. In this case, a Doppler difference frequency of $6v_d$ is received.

From the above, it may be appreciated that this invention provides a flexible apparatus for measuring the velocity of a moving surface. In particular, it is seen that this invention provides a method for enhancing the signal-to-noise ratio of laser light reflected from various surfaces and provides both a dual beam and reference beam configuration. It is further seen that this invention provides a means for measuring velocity of a rotating surface not only in a tangential direction but also in an axial direction.

One other feature of this invention is also worthy of note. Because of torque, localized compression or expansion of the spacing between grating grooves may be produced by the ensuing strain. This change does not affect the Doppler shift frequency but rather only the Bragg angles. Thus, a strain signal may be produced, independent of the Doppler signal, for example, by employing an angle shaded optical attenuator.

The present invention may be employed at a single position along a rotating shaft to determine not only v(t) but also $\Delta v(t)$. It may be employed at a plurality of positions to determine torque and modes of torsional vibration.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

We claim:

1. An apparatus for measuring velocity of a moving surface, comprising:
a grating-like structure on said surface;

means for directing at least one beam of a substantially monochromatic light onto said grating-like structure;

first and second periodicities, said first and second periodicities being at first and second different angles; and at least one detection means including at least one photo-detector positioned at a predetermined angle with respect to at least one of said beam and said surface to receive light diffracted by said grating-like structure and effective to produce a first oscillating electrical signal with a first frequency related to a first velocity of said surface in a first direction transverse to said first angle, and to produce a second oscillating electrical signal with a second frequency related to a second velocity of said surface in a second direction transverse to said second angle.

2. An apparatus for measuring velocity of a moving surface, comprising:

a grating-like structure on said surface;

said grating-like structure having at least one periodicity;

means for directing first and second mutually coherent beams of a substantially monochromatic light along first and second acute angles respectively with respect to a line perpendicular to said surface onto the same spot on said grating-like structure;

detection means including at least one photo-detector positioned at a predetermined angle with respect to at least one of said first and second beams and said surface to receive light diffracted by said grating-like structure and effective to produce an oscillating electrical signal with a frequency related to the velocity of said surface;

said first and second acute angles being selected to produce a plurality of pairs of overlapped reflected beams all having a same predetermined Doppler difference frequency.

3. An apparatus for measuring velocity of a moving surface, comprising:

a grating-like structure on said surface; said grating-like structure having at least one periodicity;

means for directing at least one beam of a substantially monochromatic light onto said grating-like structure;

detection means including at least one photo-detector positioned at a predetermined angle with respect to at least one of said beam and said surface to receive light diffracted by said grating-like structure and effective to produce an oscillating electrical signal with a frequency related to the velocity of said surface; and said grating-like structure including a plurality of rows of arc-like depressions formed in said surface by tool chatter during finishing of said surface.

4. An apparatus for measuring velocity of a moving surface, comprising:

a grating-like structure on said surface;

said grating-like structure having at least one periodicity;

means for directing at least one beam of a substantially monochromatic light onto said grating-like structure;

detection means including at least one photo-detector positioned at a predetermined angle with respect to at least one of said beam and said surface to receive light diffracted by said grating-like structure and effective to produce as oscillating electrical signal with a frequency related to the velocity of said surface; and said grating-like structure including a plurality of parallel grooves machined in said surface and a plurality of arc-like depressions formed within said plurality of parallel grooves by tool chatter during finishing of said surface.

5. An apparatus for measuring velocity of a moving surface, comprising:

a grating-like structure on said surface;

said grating-like structure having at least one periodicity;

detection means including means for producing first and second relatively coherent beams;

means for directing said first and second beams upon a single area on said grating-like structure along first and second angles respectively with respect to a line perpendicular to said surface at said area;

detection means including at least one photo-detector positioned at a predetermined angle with respect to at least one of said first and second beams and said surface to receive light diffracted by said grating-like structure and effective to produce an oscillating electrical signal with a frequency related to the velocity of said surface;

said periodicity being imperfect whereby said frequency is smeared out over a frequency range; and said first and second angles being selected to displace a center of said frequency range a large value with respect to said frequency range.

6. A method for measuring a velocity of a surface along an axis comprising:

forming a grating-like structure having at least one periodicity on said surface;

splitting a beam of substantially monochromatic light into at least first and second beams;

directing at least first beam onto said grating-like structure at a first predetermined angle with respect to a normal to said surface;

positioning a photo-detector to receive a predetermined Bragg order of light produced by said first grating-like structure from said first beam;

directing a third beam derived from said second beam into said photo-detector;

measuring a Doppler frequency derived from detection of said Bragg order and said third beam;

the step of directing at least said first beam including aligning said first beam at a first predetermined angle with respect to a normal to said surface and aligning said second beam at a second predetermined angle on an opposed side of said normal with said first and second beams overlapping on said grating-like structure, and said third beam being a second predetermined Bragg order of light produced by said grating-like structure from said second beam;

said at least one periodicity being imperfect whereby said Doppler frequency is smeared out over a frequency range; and selecting said first and second predetermined angles to displace a center of said frequency range to a large value with respect to said frequency range.

7. A method for measuring a velocity of a surface along an axis comprising:

machining said surface to produce a grating-like structure thereon having at least one periodicity on said surface;

permitting a cutting tool finishing said surface to chatter whereby substantially arc-like periodic depressions are formed in said surface;

splitting a beam of substantially monochromatic light into at least first and second beams;

directing at least said first beam onto said grating-like structure at a first predetermined angle with respect to a normal to said surface;

positioning a photo-detector to receive a predetermined Bragg order of light produced by said first grating-like structure from said first beam;

directing a third beam derived from said second beam into said photo-detector; and measuring a Doppler frequency derived from detection of said Bragg order and said third beam.

8. A method for improving statistical purity of Doppler shifts in monochromatic light reflected from a moving surface comprising:

forming a reflection-type diffraction grating on said surface;

detecting light reflected at a predetermined Bragg order different from zero for determining said doppler shifts;

said diffraction grating having imperfect periodicity whereby said Doppler shifts are smeared out over a frequency range; and impinging said light at incidence angles effective to produce a Bragg order great enough so that a frequency of a center of said frequency range is a large value with respect to said frequency range.

9. A method for measuring motion of a body comprising:

moving a diffraction grating having periodic surface variations on said body in at least one direction with said motion to be measured;

directing an illumination beam of coherent light toward said diffraction grating to produce a plurality of reflected beams from said diffraction grating at a plurality of diffraction angles;

detecting a Doppler signal which is proportional to the motion to be measured;

said periodic surface variations including imperfect periodicity whereby a frequency of said Doppler signal is smeared out over a frequency band; and the step of directing an illuminating beam includes inclining said illuminating beam at an incidence angle effective to produce at least one of said plurality of reflected beams at a diffraction angle having a diffraction order large enough to make a center of said frequency range a large value with respect to said frequency range.

* * * * *